Aug. 29, 1961 H. G. SHORE 2,998,578

PULSE WIDTH MODULATOR

Filed Jan. 27, 1959

INVENTOR.
HARVEY SHORE
BY [signature]
ATTORNEY

United States Patent Office 2,998,578

Patented Aug. 29, 1961

2,998,578

PULSE WIDTH MODULATOR

Harvey G. Shore, Los Angeles, Calif., assignor to Radio Corporation of America, a corporation of Delaware Filed Jan. 27, 1959, Ser. No. 789,373

8 Claims. (Cl. 332—9)

The present invention relates to an improved circuit for changing pulse duration and, more specifically, to an improved circuit for pulse width modulation.

It is sometimes necessary in radar beacon applications to modulate, at a video rate, the width of a pulse produced by a delay line controlled pulse generator. This may be done by changing the delay line length at the required rate. But, simple circuits for doing this have not heretofore been available. For example, if a second delay line were connected to the first through a series switch such as a diode and the switch then opened and closed at a video rate, the desired result would not be obtained. The diode would only allow propagation along the line in one direction, whereas the wave must travel in two directions for the circuit to operate properly. The same objection would be present if diode switches were used to select from among several delay lines of different lengths. Back-to-back connected diodes might possibly be used but this would increase the complexity of the circuits connected to the diodes and would probably require gate pulses of opposite polarities. The invention described below uses only a single diode and a very simple circuit.

Two delay lines are employed each of which has an input terminal, an output terminal and a common input-output third terminal. The third terminal of the first line is connected to ground and the output terminal of the first line is connected to the input terminal of the second. The pulse duration is modulated by connecting and disconnecting the third terminal of the second line to ground at the desired rate. A single diode may be used as the switch. When both common terminals are connected to ground, the two delay lines act like delay lines in series and the pulse duration is long. When the common terminal of the second line floats, the second delay line is effectively out of the circuit and the pulse duration is short.

Figure 1:
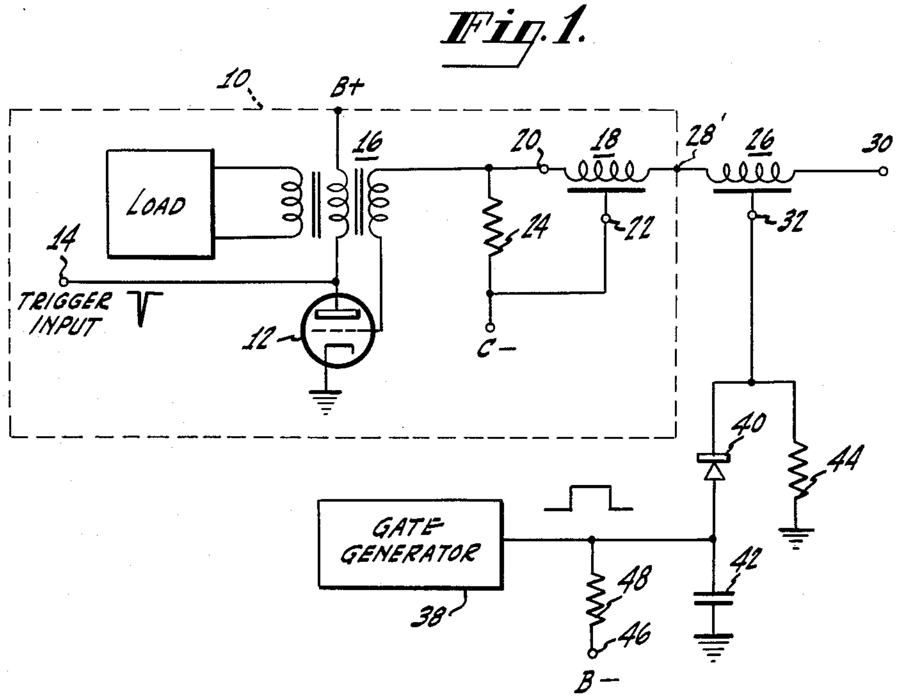
Figure 2:
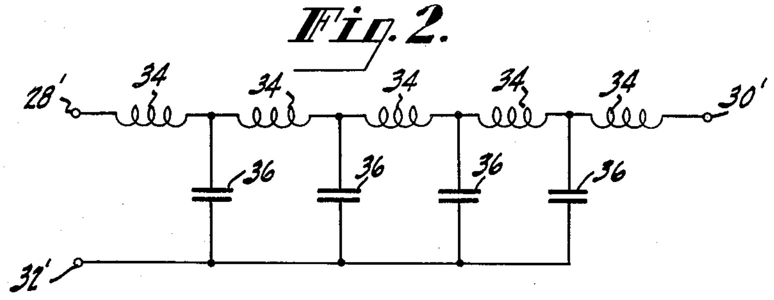

The invention will be described in greater detail by reference to the following description taken in connection with the accompanying drawing in which:

FIG. 1 is a block and schematic circuit diagram of a preferred form of the invention; and FIG. 2 is an equivalent circuit of an element shown in FIG. 1.

The portion of FIG. 1 shown within the dashed block 10 is a conventional, delay line controlled blocking oscillator. In brief, the grid potential of triode 12 is abruptly raised by applying a negative trigger pulse from input terminal 14 to the primary winding of pulse transformer 16. Regeneration drives the grid further positive. The plate current rises rapidly at first and the plate voltage drops. The current in the grid circuit charges a first delay line 18. After a time depending on the characteristics of the delay line, the voltage drop across the input terminals 20, 22 of the delay line changes abruptly and causes a sharp drop in the grid potential. The corresponding drop in plate current drives the grid beyond cutoff by regenerative action. The charge on the delay line leaks off through the grid resistor 24 and the circuit is ready to be triggered again.

A second delay line 26 having an input terminal, an output terminal 30, and a common input-output terminal 32 is placed in circuit with delay line 18. As is understood by those skilled in the art, the delay lines 18 and 26 may include lumped and/or distributed elements and may be represented as shown in FIG. 2. Each delay line includes an inductance which may be represented as a series coil 34 and a capacitance which may be represented as a plurality of capacitive elements 36 connected between spaced points along the coil and a common terminal. Thus, the delay line is commonly thought of as a three terminal network, the third terminal 32' being common both to the input circuit 28', 32' and the output circuit 30', 32'.

The output of the first delay line 18 is open circuited, common terminal 22 being connected to A.C. ground through C— or, if desired, terminal 22 may be directly connected to ground instead. The input terminal of the second delay line 26 is connected to the output terminal of the first delay line 18, at 28'. It has been found that when terminal 32 of the second delay line 26 floats, delay line 26 is effectively out of the circuit and the pulse output of the blocking oscillator remains at substantially the same width. However, when common terminal 32 is effectively connected to ground, the two delay lines 18 and 26 are effectively connected in series and the pulse width output of the blocking oscillator is a function of the sum of the delays introduced by lines 18 and 26.

In a typical circuit, it is desired to change the width of the pulses at a video rate. This is accomplished by the switching circuit including gate generator 38, diode 40, capacitor 42 and resistor 44. The diode is normally cut-off by the negative voltage applied from terminal 46 through resistor 48 to the anode of the diode. The gate generator 38 produces positive pulses which render the diode conductive. During the pulse intervals, terminal 32 of the delay line is connected through diode 40 and capacitor 42 to ground. Capacitor 42, of course is of relatively large value and provides a short circuit at the blocking oscillator pulse frequencies of interest. Resistor 44, on the other hand, is very large and looks to terminal 32 like an open circuit. The purpose of resistor 44 is to provide a return path for the circuit of diode 40.

Although the invention has been described in terms of a blocking oscillator, it is to be understood that it is applicable to other delay line controlled pulse generators. It is applicable, for example, to delay line controlled multivibrators. It is also to be understood, that, as in all line controlled pulse generators, a longer duration pulse is produced in the absence of the delay line than the duration desired. Otherwise, the generator would cut itself off before it received the pulse reflected from the far end of the delay line.

What is claimed is:

1. In a delay line controlled pulse generator of the type including an open circuited first delay line, the delay of which controls the pulse duration, a second delay line having an input terminal connected to the open circuited end of said first delay line, an open circuited output terminal, and a third terminal common to both the input and output circuits of said second delay line; and means for connecting said third terminal to ground, whereby said pulse duration is increased.

2. In a delay line controlled pulse generator of the type including an open circuited first delay line, the delay of which controls the pulse duration: a second delay line having an input terminal connected to the open circuited end of said first delay line, an open circuited output terminal, and a third terminal common to both the input and output circuits of said second delay line; and means for connecting said third terminal to ground, whereby said pulse duration is increased, said means including a normally cut-off diode connected between said third terminal and ground, and means for applying a pulse to said diode in a sense to render it conductive.

3. A pulse width modulator comprising, in combination, a delay line controlled pulse generator of the type including an open circuited first delay line, the delay of which controls the pulse duration; a second delay line having an input terminal connected to the open circuited end of the first delay line, an open circuited output terminal and a third terminal connected to both the input and output circuits of said second delay line; a normally cut-off diode connected between the third terminal of said second delay line and a point at an A.C. reference potential; and means for applying gate pulses to said diode in a sense to render the same conductive.

4. In combination, a pair of delay lines each having an input terminal, an output terminal, and a third terminal common to both the input and output circuits of the delay line, the output terminal of one delay line being connected to the input terminal of the second delay line and the common terminal of one line being connected to a point at a reference potential; and switching means including a unilaterally conducting device for intermittently connecting the common terminal of said other line to said reference potential point.

5. The invention according to claim 4 wherein said switching means further includes means for repetitively applying a voltage pulse to said unilaterally conducting device for rendering it alternately conducting and non-conducting.

6. In combination, a plurality of delay line sections connected in cascade, said sections each comprising a series inductance and a shunt capacitor, the shunt capacitor of each section being connected between the inductance of its section and a point at a reference potential when the delay line section is effective as a delay line, at least one of said delay line sections having its shunt capacitor connected to said point of reference potential through switching means, said switching means comprising a unilateral conducting device and further comprising means for making said device either conducting or non-conducting whereby said one delay line section is effective to function as a delay line section when said device is conducting and is ineffective to function as a delay line section when said device is non-conducting.

7. In combination, a plurality of delay line sections connected in cascade, said sections each comprising a series inductance and a shunt capacitor, the shunt capacitor of each section being connected between the inductance of its section and a point at a reference potential when the delay line section is effective as a delay line, certain of said delay line sections having their shunt capacitors connected to said point of reference potential through switching means, said certain delay line sections having an open end termination when functioning as a delay line, said switching means comprising a unilateral conducting device and further comprising means for making said device either conducting or non-conducting whereby said certain delay line sections are effective to function as a delay line when said device is conducting and are ineffective to function as a delay line when said device is non-conducting.

8. In a delay line controlled pulse generator of the type including an open circuited first delay line, the delay of which controls the pulse duration; a second delay line having an input terminal connected to the open circuited end of said first delay line and having an open circuited output terminal, and a third terminal common to both the input and output circuits of said second delay line; and switching means for connecting said third terminal to ground, whereby said pulse duration is increased, said switching means comprising a unilateral conducting device and further comprising means for making said device either conducting or non-conducting whereby said second delay line is effective to function as a delay line when said device is conducting and is ineffective to function as a delay line when said device is non-conducting.

References Cited in the file of this patent

UNITED STATES PATENTS

| | | |
|---|---|---|
| 2,382,413 | Hanert | Aug. 14, 1945 |
| 2,535,093 | Robinson et al. | Dec. 26, 1950 |
| 2,877,383 | Lasher | Mar. 10, 1959 |